United States Patent [19]

Kataoka et al.

[11] Patent Number: 4,992,231
[45] Date of Patent: Feb. 12, 1991

[54] EMERGENCY CORE COOLING SYSTEM

[75] Inventors: Yoshiyuki Kataoka, Toukai; Masanori Naitoh, Hitachi; Takashi Ikeda, Katsuta; Hisamichi Inoue, Takahagi; Hiroaki Suzuki, Hitachi, all of Japan

[73] Assignee: Hitachi, Ltd., Tokyo, Japan

[21] Appl. No.: 587,525

[22] Filed: Mar. 8, 1984

[30] Foreign Application Priority Data

Mar. 9, 1983 [JP] Japan .................................. 58-37470

[51] Int. Cl.[5] ............................................. G21C 15/18
[52] U.S. Cl. ..................................... 376/282; 376/283
[58] Field of Search ................................. 376/282, 283

[56] References Cited

U.S. PATENT DOCUMENTS

| 3,168,445 | 2/1965 | Ziegler et al. | 376/283 |
| 3,300,388 | 1/1967 | Jerman et al. | 376/282 |
| 3,666,616 | 5/1972 | Schluderberg | 376/283 |
| 4,093,513 | 6/1978 | Berens et al. | 376/282 |

FOREIGN PATENT DOCUMENTS

| 2360758 | 6/1975 | Fed. Rep. of Germany . | |
| 0035893 | 3/1978 | Japan | 376/282 |
| 0148694 | 12/1978 | Japan | 376/282 |
| 0111097 | 8/1979 | Japan | 376/282 |
| 1414305 | 11/1975 | United Kingdom | 376/282 |

OTHER PUBLICATIONS

Strauss, Power, Jan. 1968, pp. 159–166.

Primary Examiner—Charles T. Jordan
Assistant Examiner—Richard W. Wendtland
Attorney, Agent, or Firm—Antonelli, Terry, Stout & Kraus

[57] ABSTRACT

An emergency core cooling system for spraying cooling water onto a nuclear reactor core of a nuclear reactor includes at least one header disposed in the nuclear reactor and arranged at an upper and outer circumferential position with respect to the reactor core. A plurality of spray nozzles are mounted on the at least one header for spraying cooling water onto the reactor core. The spray nozzles have a center axis and at least one of the plurality of spray nozzles is mounted on the at least one header so that the center axis thereof extends upwardly with respect to a horizontal axis whereas at least one of the remaining plurality of spray nozzles has the center axis thereof extending downwardly with respect to the horizontal axis. Cooling water is conducted to the at least one header for enabling spraying of the water in the emergency situation.

20 Claims, 6 Drawing Sheets

EMERGENCY CORE COOLING SYSTEM

The present invention relates to an emergency core cooling system for a nuclear reactor which operates upon occurrence of an accident.

An emergency core cooling system installed on a boiling water reactor has a large number of spray nozzles mounted on ring an annular headers. The ring headers are disposed at upper outer circumferential positions of a reactor core composed of a large number of fuel channels. Upon occurrence of a loss-of-coolant accident, emergency cooling water which is driven by an emergency core cooling system pump is conducted to the headers and sprayed onto the fuel channels through the nozzles. For safety purposes, a multiple protection arrangement is provided for the nuclear reactor wherein two, i.e., upper and lower stages of ring headers are disposed on the upper outer circumferences of the core and constructed so that the core is sufficiently cooled even when one of the two stages becomes inoperative. Additionally, a system for injecting water directly into the core is also provided. Generally, mounting angles of the nozzles mounted on the lower header stage are somewhat upward as compared with those mounted on the upper header stage. However, the nozzles mounted on both the lower and upper header stages extend downwardly with respect to the horizontal axes thereof. Here the "mounting angle o the nozzle" signifies the direction in which the center axis of the outlet hole of the nozzle extends.

As stated above, the headers are arranged at the outer circumferential positions of the core so as to surround the core. A large number of spray nozzles are mounted on the upper and lower header stages in a manner so as to face the center of the core and the emergency cooling water is sprayed from the nozzles in a distribution pattern as discussed hereafter. The fuel channels arrayed at the peripheral part of the core are distributively supplied with the emergency cooling water by the contributions of only several adjacent spray nozzles, whereas the fuel channels at the central part of the core are supplied with quantities of emergency cooling water by the superposed contributions of substantially all of the spray nozzles. Accordingly, the prior arrangements provides for the mounting angles $\theta$ of the spray nozzles to be in a downward direction with respect to the horizontal axes as described before, in order that the spray water from each spray nozzle may be distributed more in a region nearer to the nozzle (in the peripheral part of the core) and less in a region far from the nozzle (in the central part of the core).

When a loss-of-coolant accident occurs the emergency cooling water is sprayed into a stream atmosphere at the upper portion of the reactor through the spray nozzles. An experiment was accordingly conducted in which cooling water was sprayed into a steam atmosphere by the use of one spray nozzle. As a result, it has been revealed that the water distribution phenomena differ in a steam environment from that distribution considered to be provided by prior arrangements. That is, the emergency cooling water sprayed from the nozzle is usually at a low temperature and in a subcooling temperature state. Therefore, when the emergency cooling water is sprayed into the steam atmosphere, the water exchanges heat with the steam to condense the steam. The condensation takes place for the steam in both an inner space and outer space of a spray water annulus.

It has been determined that in a case where the steam is condensed in the outer space of the spray water annulus, a pressure decrease due to the condensation is small because the space has a large volume. In contrast, in the inner space of the spray water annulus, a pressure decrease due to the steam condensation becomes large for the reasons that the inner space has a small volume and that the space is surrounded with the water screen of the cooling water or a large number of water drops and is supplied with a small amount of steam from the environment. Therefore, the pressure of the internal space becomes lower than that of the outer space. There has been observed the phenomenon of the collapse of the water annulus in which the difference of the pressures squeezes the spray water annulus toward the inner space. Thus, it has been revealed that the path length of the spray water shortens due to the collapsing phenomenon of the spray jet.

An object of the present invention is to provide an emergency core cooling system for a nuclear reactor which is well-suited for use in steam environment which is the actual operating atmosphere of emergency core cooling systems.

Another object of the present invention is to provide an emergency core cooling system for a nuclear reactor wherein at least a portion of the nozzles of at least one header stage are mounted with an upwardly directed angle with respect to the horizontal axis for providing an improved water distribution in a steam environment.

In accordance with the present invention, an emergency core cooling system for a nuclear reactor includes at least one header stage disposed on an upper outer circumference of the reactor core, a plurality of nozzles mounted on the header stage, at least a portion of the nozzles having center axes mounted so as to extend in upward direction with respect to the horizontal axis and an arrangement for conducting cooling water to the header stage whereby an improved water distribution is obtained at the time of a loss-of-coolant accident.

According to a feature of the present invention at least some of the spray nozzles installed on a lower header stage are mounted upwardly with respect to the horizontal axis so as to distribute into the central area of the core the spray water in an amount necessary for the cooling of the core, and the remaining spray nozzles are mounted so as to distribute the spray water into the peripheral area of the core whereby an optimum peformance of the emergency core cooling system is exhibited.

These and further objects, features and advantages of the present invention will become more obvious from the following description when taken in connection with the accompanying drawings which show for purposes of illustration only, several embodiments in accordance with the present invention.

Figure 1:
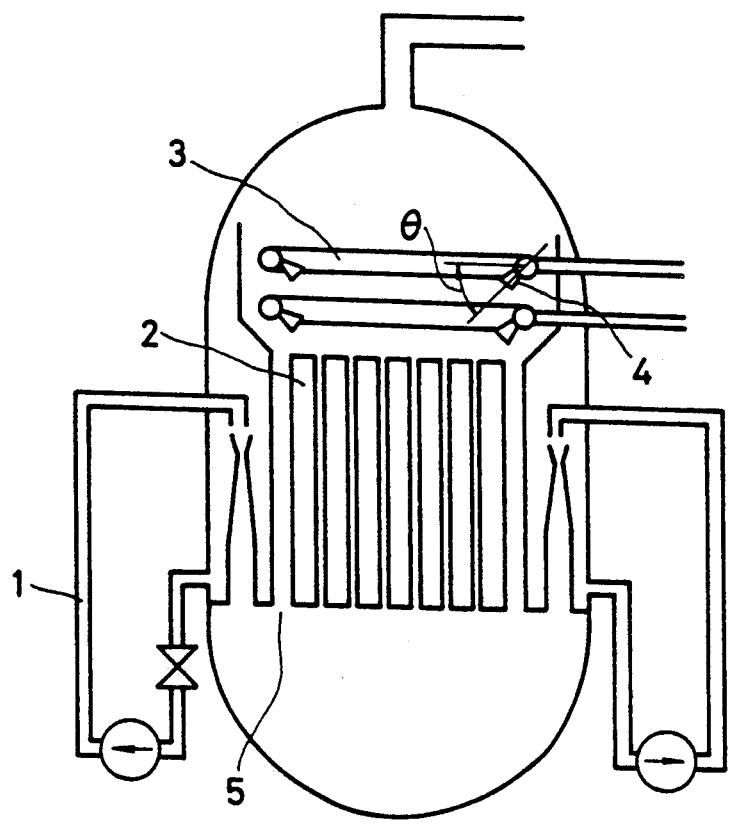
FIG. 1 is a schematic representation of a vertical section of a boiling water reactor with a core spray cooling arrangement.

FIG. 1 schematically illustrates a vertical section of a boiling water nuclear reactor with a core spray cooling arrangement which forms one part of an emergency core cooling system installed on the reactor. The core spray cooling arrangement is constructed so that a large number of spray nozzles 4 are mounted on upper and lower stages of ring or annular headers 3 (hereinafter referred to as "headers") which are disposed at the upper outer-circumferential positions of a reactor core 5, which core is formed of a large number of fuel channels 2. At the occurrence of a loss-of-coolant accident, emergency cooling water which is driven by an emergency core cooling system pump (not shown) is sprayed onto the fuel channels 2 through the nozzles 4. The reactor is also provided with a water recirculation system 1.

Figure 2:
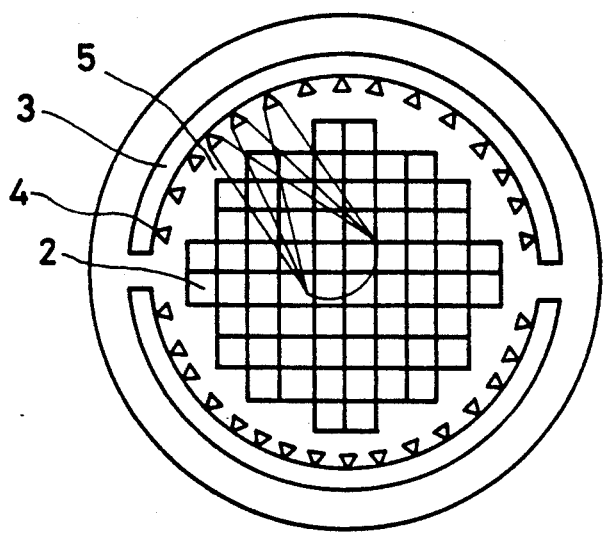
FIG. 2 is a schematic representation of a horizontal section of the boiling water reactor having the core spray cooling arrangement.

FIG. 2 schematically illustrates a horizontal section of FIG. 1 and showing an intended water spray distribution. As stated before, the core 5 is composed of a large number of fuel channels 2, the headers 3 are arranged at the outer circumferential positions so as to surround the core 5, and a large number of spray nozzles 4 are mounted on the upper and lower stages of headers in a manner so as to face the center of the core 5. The aspect in which the emergency cooling water sprayed from the spray nozzles 4 is distributed to the fuel channels of the core 5 will be outlined with reference to FIG. 2 with areas on which the respective spray nozzles 4 spray the emergency cooling water being indicated. As seen from the figure, the fuel channels arrayed at a peripheral part of the core are distributively supplied with the emergency cooling water by the contributions of only several adjoining spray nozzles, whereas the fuel channels at the central part of the core have large quantities of emergency cooling water supplied thereto by the superposed contributions of substantially all of the spray nozzles.

Figure 3:
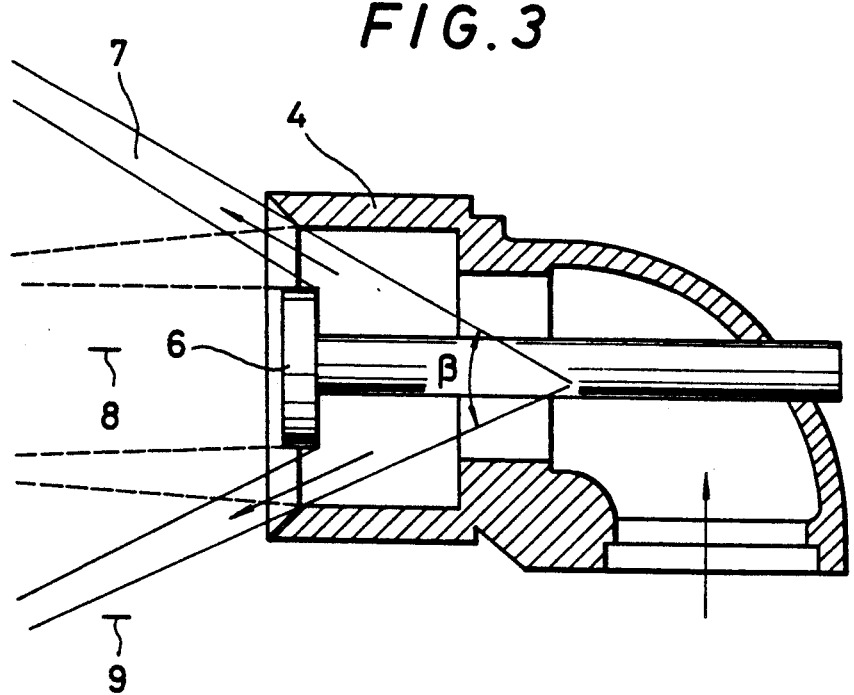
FIG. 3 is a sectional view of a spray nozzle utilized in the core spray cooling arrangement.

Spray nozzles 4 used in core spray cooling arrangements are classified into several types, among which a nozzle of the type shown in FIG. 3 is representative. In the spray nozzle of this type, emergency cooling water is caused to collide against a circular baffle board 6 disposed in the opening of the outlet of the nozzle, to promote the formation of cooling water drops. Simultaneously, the cooling water is sprayed from an annular outlet formed by the nozzle body 4 and the baffle board 6, to provide a core or annular spray 7 having a spread angle $\beta$ for enabling the cooling water to be sprayed over a large area. Since the core spray cooling arrangement operates at the occurrence loss-of-coolant accident as stated before, the emergency cooling water is sprayed into the steam environment through the spray nozzles.

An experiment was conducted in which cooling water was sprayed into a steam atmosphere by the use of one spray nozzle of the type shown in FIG. 3. As a result, it has been determined that the water distribution is not provided as has been considered in the past. The emergency cooling water sprayed from the nozzle is usually at a low temperature and in a subcooling temperature state so that when the water is sprayed into the steam atmosphere, the emergency cooling water exchanges heat with the steam to condense it. The condensation takes place for the steam in both an inner space 8 and an outer space 9 of the spray water annulus 7 in FIG. 3. In a case where the steam is condensed in the outer space 9 of the spray water annulus 7, a pressure decrease due to the condensation is small because the sapce has a large volume. In contrast, in the inner space 8 of the spray water annulus 7, a pressure decrease due to the steam condensation becomes large for the reasons that the space has a small volume and that the space is surrounded with the water screeen of the cooling water or a large number of water drops and is supplied with a small amount of steam from the environment. Therefore, the pressure of the internal space 8 becomes lower than that of the outer space 9. There has been observed the phenomenon of the collapse of the spray water annulus 7 in which the difference of the pressures squeezes the spray water annulus toward the inner space 8. For this reason, the spread angle $\beta$ of the spray water annulus 7 becomes smaller than a value having hitherto been considered and becomes a spray annulus as indicated by broken lines in FIG. 3.

Figure 4:
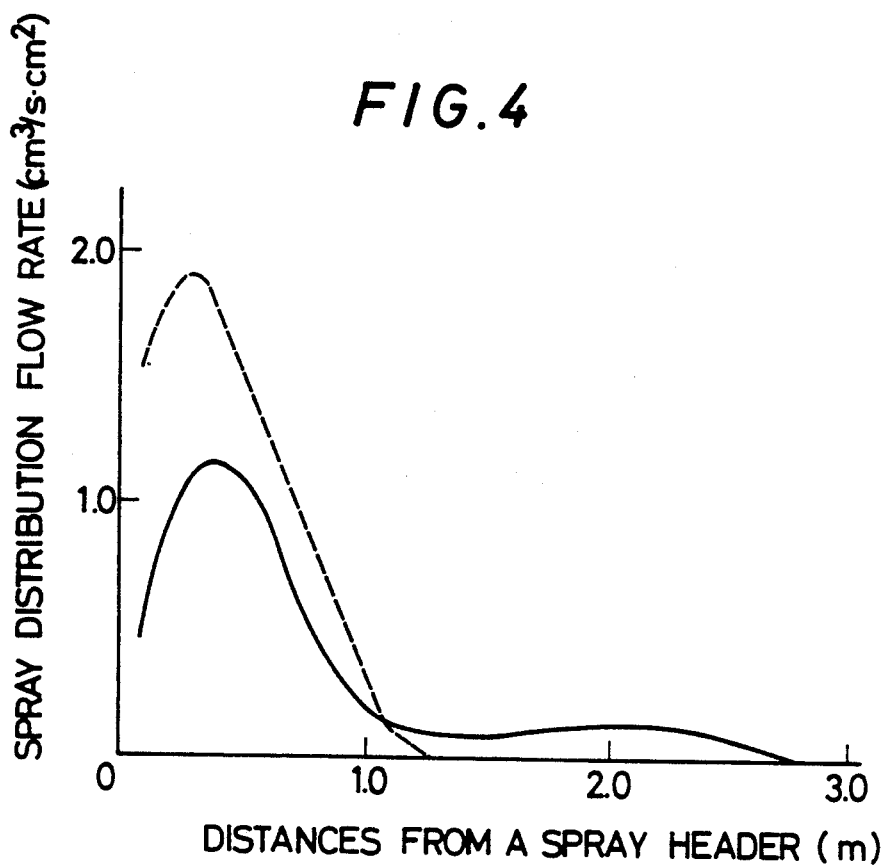
FIG. 4 illustrates a curve of a spray distribution characteristic previously considered to be provided by the spray nozzle of FIG. 3 and that of the actual spray distribution in steam of the spray nozzle of FIG. 3.

FIG. 4 illustrates the comparison of the distribution characteristics of spray water from one typical spray nozzle in the case hitherto considered and in the case where the collapsing phenomenon of the jet due to the steam condensation has taken place as stated above. The figure shows curves plotted for spray distribution flow rates per unit area and per unit time versus distances from a spray header. A solid line curve in the figure indicates the distribution characteristic hitherto considered wherein the spray nozzle mounted in a downward direction was considered to provide a water spray distribution of a large amount in the vicinity of the nozzle, and water is also distribution afar off the nozzle. Indicated by a broken line curve in the figure is the actually determined distribution characteristic for the case where the spray jet has collapsed on account of the steam condensation, and as shown the spray water is concentrically distributed only in the vicinity of the nozzle. Thus, it has been revealed that the path length of the spray water shortens due to the collapsing phenomenon of the spray jet.

Regarding spray nozzles of the other types (for example, a nozzle which is not provided with the baffle board 6 disposed at the hole of the nozzle shown in FIG. 3 and which is merely open at its hole), the sprayed cooling water also forms into drops and forms some inner space, and, hence, the tendency that the path length of the cooling water shortens is qualitatively held more or less. As described before, the collapsing phenomenon of the spray jet takes place due to the condensation of the steam. Therefore, when the environment pressure becomes high, the satuation temperature becomes high, and the subcooling of the cooling water sprayed from the spray nozzle increases. As a result, the condensation into the spray water increases, the spread angle of the spray jet decreases more due to the collapsing phenomenon of the jet, and the path length becomes short. However, the change of the path length of the spray water ascribable to the change of the environment pressure is small in the range of pressures, 10 kg/cm$^2$ to 1 kg/cm$^2$ in which the core spray cooling arrangement operates.

The present invention is based upon the results obtained by studying the spray water distributing capability of the core spray cooling arrangement for the fuel channels operating in the steam environment upon the occurrence of an accident by recognizing that the path length of the spray water needs to be stretched more than has hitherto been considered, by taking it into account that the path length of the spray water is shortened by the collapsing phenomenon of the jet attributed to the steam condensation. More particularly, the present invention provides that the path length of the spray water is stretched in advance by making the mounting angles of the spray nozzles upward with respect to the horizontal axis.

The core spray cooling arrangement is equipped with the two systems of the upper and lower states in accordance with the multiple protection concept for a nuclear reactor as previously discussed, and a case where either system does not operate is considered. First, there will be described a case where only the core spray cooling arrangement of the lower stage operates.

Figure 5:
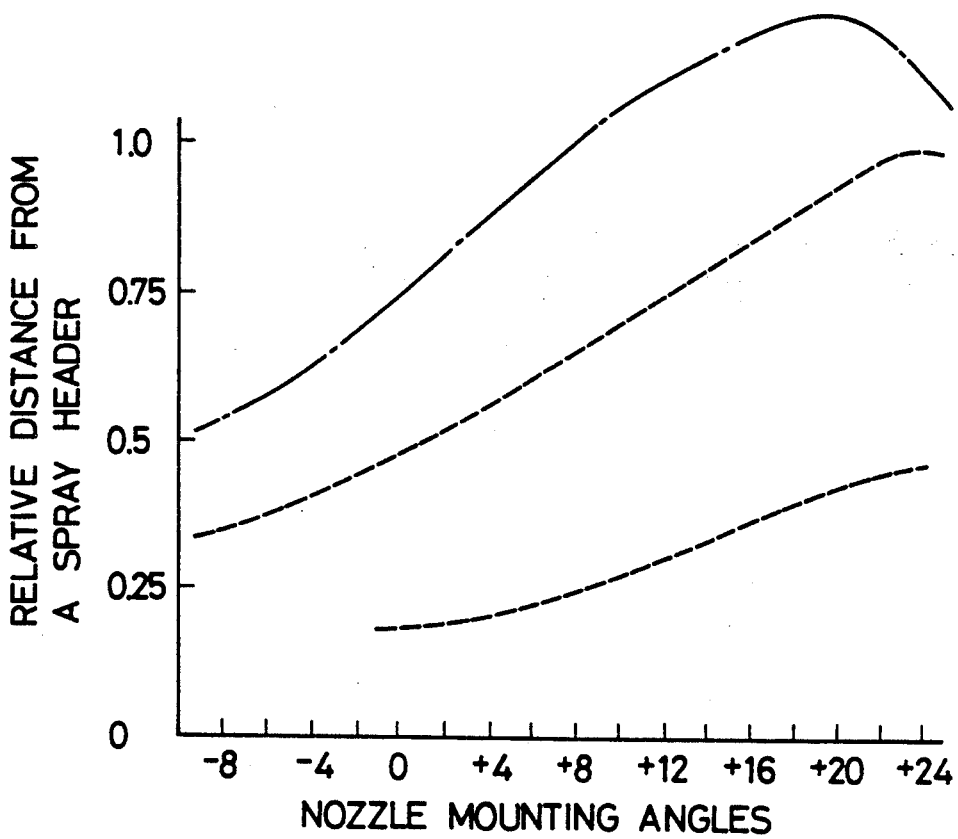
FIG. 5 illustrates curves showing the correlation between the nozzle mounting angle and spray distribution characteristic of a spray nozzle installed on a lower header stage.

FIG. 5 illustrates the nozzle mounting angle-dependency of the spray distribution characteristic in a steam atmosphere, of one nozzle without a baffle board attached to the core spray cooling arrangement of the lower stage. In the figure, the abscissa represents the nozzle mounting angle, while the ordinate represents the relative distance from the spray header to the center of the core. In the figure, at various nozzle mounting angles, the areas in which the relative spray flow rate is at least 0.1 in the fuel channels located in front of the nozzle are indicated by the area between the dashed or broken lines. Here, the "relative spray flow rate" is obtained in such a way that the quantity of the spray water distribution into the fuel channel is normalized by the average value of 0.5 l/s per fuel channel, the value being used in the design of the pump of the core spray cooling arrangement. Regarding the nozzle mounting angle $\theta$, plus signifies an upward mounting with respect to a horizontal axis, and minus signifies a downward mounting. According to the figure, in a case where the nozzle mounting angle $\theta$ is 0° (horizontal), the relative spray flow rate is at least 0.1 in the area in which the relative distance from the spray header is about 0.2 to about 0.5. As the nozzle mounting angle $\theta$ increases (becomes more upwardly directed), the area in which the relative spray flow rate is at least 0.1 shifts from the vicinity of the nozzle toward the center of the core. It is known that sufficient cooling of the core upon occurrence of an accident is obtained with a relative spray flow rate of at least 0.16. As apparent, by providing an upward nozzle mounting angle with respect to the horizontal axis, the spray nozzles attached to the lower stage of the header distribute a considerable amount of spray water to the central area of the core. (By way of example, at $\theta = +24°$, approximately 60% of an amount required for the fuel channel cooling is distributed.) In view of this fact, in accordance with the present invention, at least some of the spray nozzles installed on the lower stage header are mounted upwardly with respect to the horizontal axis, to distribute into the central area of the core the spray water in an amount necessary for the cooling of the core, with the spray water being distributed into the other area by the remaining spray nozzles, whereby the optimum performance of the core spray cooling arrangement is exhibited upon occurrence of an accident.

Figure 6:
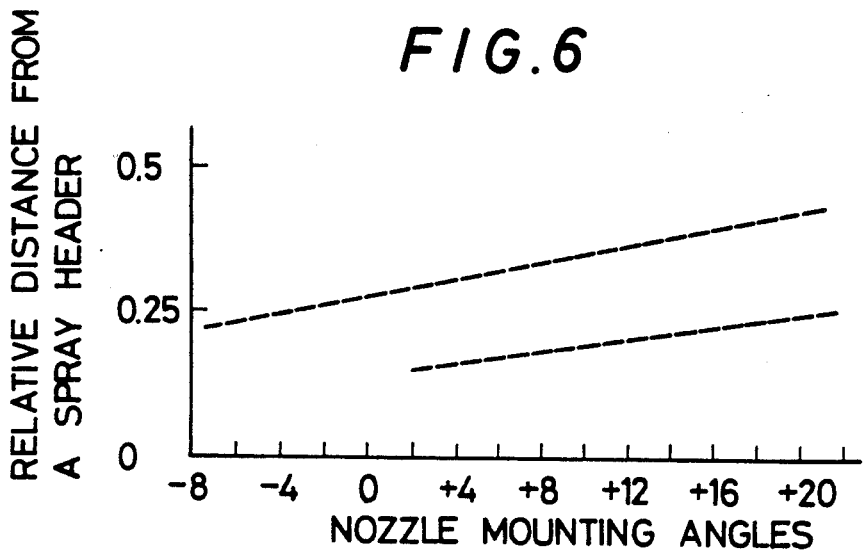
FIG. 6 illustrates curves showing the correlation between the nozzle mounting angle and spray distribution characteristic of a nozzle which is installed on the lower header stage and which is of a type different from that of FIG. 5.

The nozzle angle-dependency of the spray water distribution characteristic in the steam, of one spray nozzle having a baffle board and installed on the lower stage header is illustrated in FIG. 6. It is apparent from the figure that the nozzle of this type has little angle-dependency of the spray water path length. That is, in the nozzle of this type, even when the nozzle mounting angle is directed upwardly, the spray water is substantially concentrically distributed in the vicinity of the nozzle. The lower stage header of the core spray cooling arrangement, in accordance will the present invention, is alternately equipped with the nozzles of the types whose distribution characteristics are shown in FIGS. 5 and 6. Under the condition of the operation in the steam environment, roles are so allotted that the spray water is distributed to the central area of the core by the nozzles of the characteristic shown in FIG. 5, while the spray water is distributed to the peripheral area of the core by the nozzles of the characteristic shown in FIG. 6, whereby the optimum performance as the core spray cooling arrangement is exhibited.

On this basis, the appropriate mounting angle of the nozzle which distributes the spray water to the central area of the core (and whose characteristic is shown in FIG. 5) is considered. In the characteristics of FIG. 5, the greatest path length of the water sprayed from the nozzle is indicated by a dot-and-dash line in the figure. It is seen that, in order to distribute the spray water up to the core center by this nozzle, the nozzle mounting angle $\theta$ needs to be set at, at least, $+8°$. In addition, when the nozzle mounting angle $\theta$ exceeds approximately $+20°$, the greatest path length decreases. It is, therefore, considered that an angle of $+25°$ is suitable as the upper limit of the nozzle mounting angle.

Figure 7:
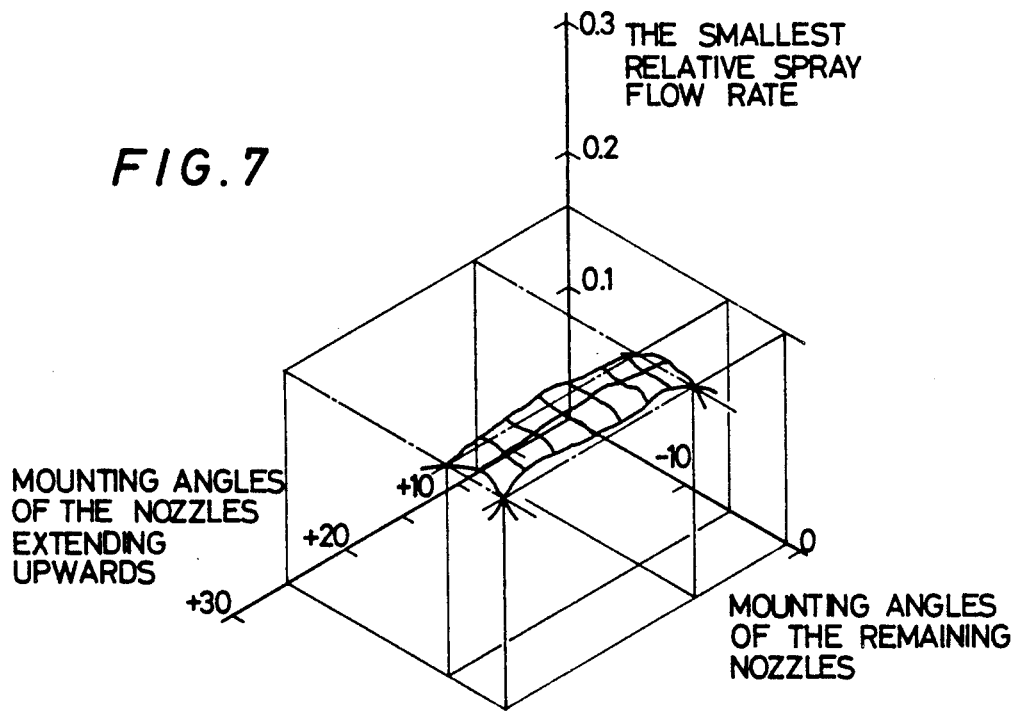
FIG. 7 is a diagram showing the correlation between the combination of the mounting angles and the smallest value of the relative spray flow rate, of a nozzle which is installed on a lower header stage.

In a case where the mounting angles $\theta$ of the nozzles for spraying water to the center of the core are limited to $+8° \leq \theta \leq +25°$, the appropriate mounting angles of the remaining nozzles will be considered. FIG. 7 shows the calculated results of the amounts of spray distribution to the core, in various combinations between the mounting angles of the nozzles extending upwardly with respect to the horizontal axis and those of the remaining nozzles extending downwardly. The figure illustrates the smallest relative spray flow rate in the calculated results (the smallest relative spray flow rate for several hundred fuel channels located in the core) for each of the combinations of the nozzle mounting angles, and as to an area in which the value of the smallest relative spray flow rate is not smaller than the relative spray flow rate sufficient for the fuel cooling, namely, 0.16. According to the results, when the mounting angles $\theta$ of the remaining nozzles (with the role of distributing the spray water to the peripheral part of the core) fall in a range of $-6° \leq \theta \leq -1°$, the smallest relative spray flow rate is at least 0.16, and the optimum performance is exhibited by the core spray cooling arrangement.

Figure 8:
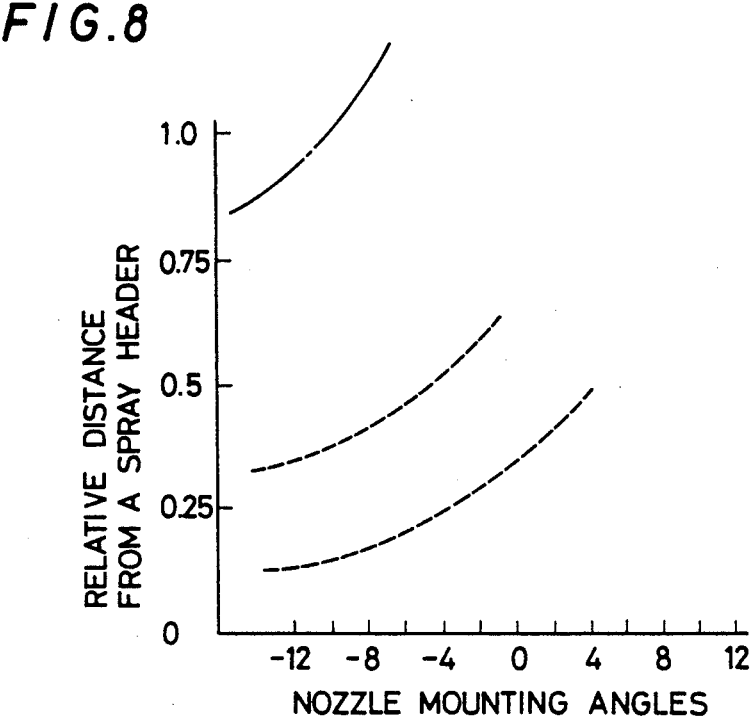
FIG. 8 illustrates curves showing the correlation between the nozzle mounting angle and the spray distribution characteristic, of a spray nozzle which is installed on an upper header stage.
Figure 9:
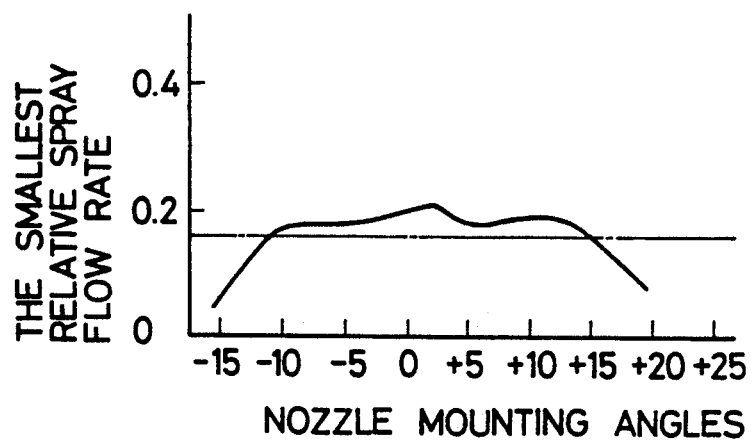
FIG. 9 illustrates a curve showing the correlation between the mounting angle and the smallest value of the relative spray flow rate, of the spray nozzle which is installed on the upper header stage.

Next, a case is described where only the core spray cooling arrangement of the upper stages operates. FIG. 8 shows the angle-dependency of the spray water distribution characteristic in the steam environment, of one spray nozzle installed on the upper stage header. The nozzle attached to the upper stage header is higher in position than the nozzle of the lower stage, and it has a high velocity at the outlet due to a small nozzle hole area. For such reasons, the greatest path length (dot-dash line curve in the figure) is large in the steam environment, and the distribution of the spray water is not concentrated. As to the core spray cooling arrangement of the upper stage header on which this nozzle is installed, the correlation (calculated results) between the nozzle mounting angle and the smallest value of the relative spray flow rate is illustrated in FIG. 9. According to the results, when the nozzle installed on the upper stage header has a nozzle mounting angle $\theta$ in a range of $-10° \leq \theta \leq +15°$, the smallest relative spray flow rate is at least 0.16, and the optimum performance of the core spray arrangement is exhibited.

In a case where the core spray arrangement of both the upper and lower stage headers operate, the amount of the spray water to be distributed to the fuel channels becomes substantially the sum between the amounts in the cases where the upper stage and the lower stage operate solely, respectively. Accordingly, when the spray nozzle mounting angles of the upper stage and the lower stage are met, an optimum performance for the core spray cooling arrangement is exhibited.

Figure 10:
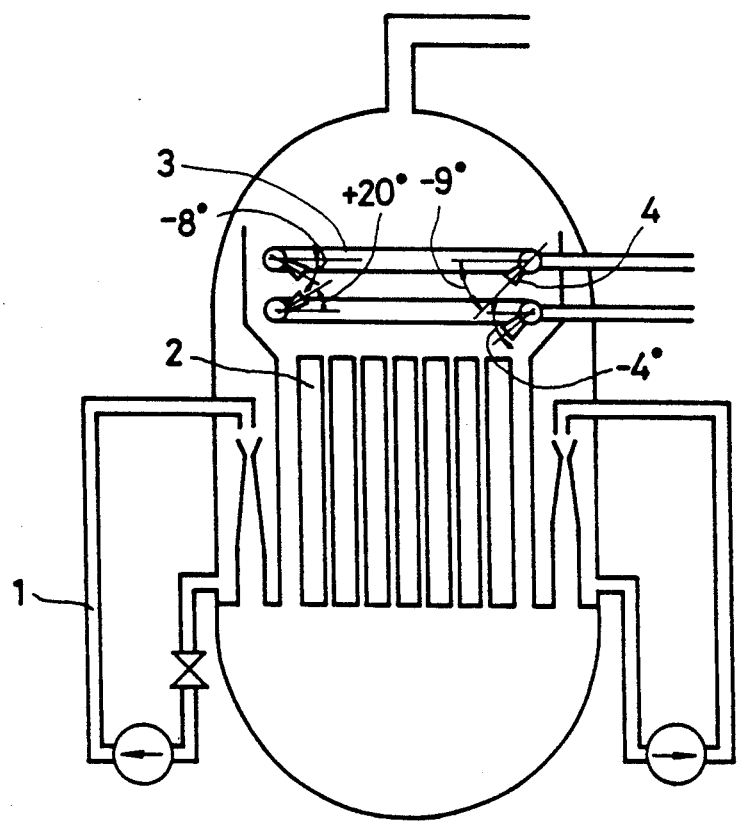
FIG. 10 is a schematic representation of a vertical section of a nuclear reactor in accordance with an embodiment of the present invention.

An embodiment of the present invention is shown in FIG. 10. In the embodiment, in the core spray arrangement of the two systems of an upper stage and a lower stage, half of the spray nozzles among the total number of spray nozzles installed on the lower stage header are mounted at an angle of $+20°$, with the remaining nozzles of the lower stage header being mounted at an angle of $-4°$. On the other hand, the nozzles installed on the upper stage header are mounted alternately at angles of $-8°$ and $-9°$. The nozzles 4 with the different mounting angles are alternately mounted about the annular or ring headers 3.

Figure 11:
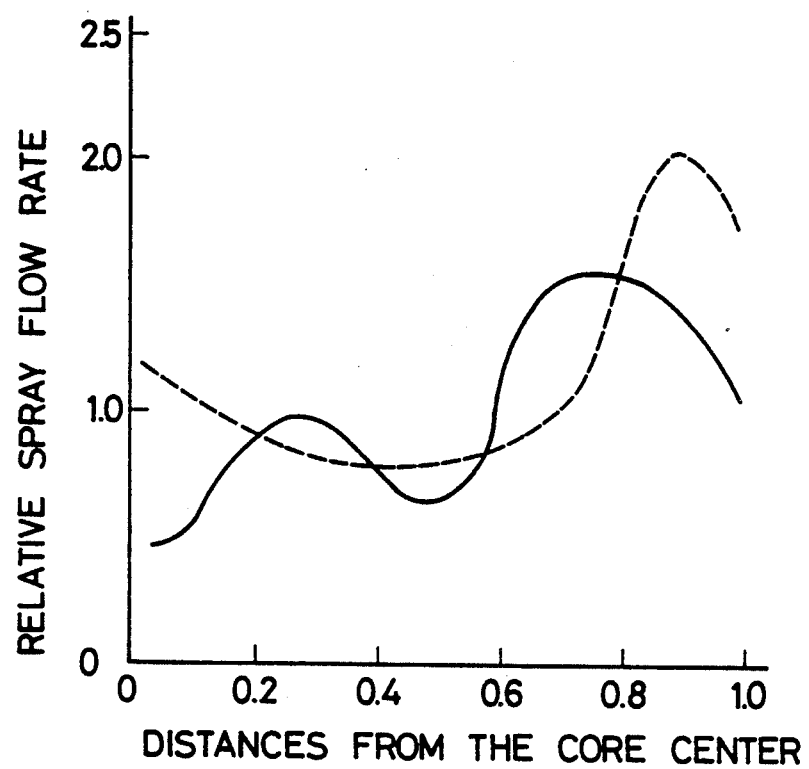
FIG. 11 illustrates curves showing the correlation between the distance from a core center and the relative spray flow rate at each position in accordance with the embodiment of FIG. 10.

FIG. 11 illustrates the calculated results of the relative spray flow rate versus the distance from the core center, in the case where the present embodiment operates at a loss-of-coolant accident. (The calculated results are given as the average values of the relative spray flow rates at respective relative radial positions of the core.) The figure shows cases where the core spray cooling arrangement of the upper stage and the lower stage operate solely, respectively. With the present embodiment, the smallest relative spray flow rate is at least 0.16 as stated before, and the relative spray flow rates at the respective relative radial positions of the core become substantially uniform as shown in FIG. 11. Thus, it is apparent that the present invention provides an improved emergency core cooling system.

While we have shown and described several embodiments in accordance with the present invention, it is understood that the same is not limited thereto but is susceptible of numerous changes and modifications as known to those skilled in the art and we therefore do not wish to be limited to the details shown and described herein but intended to cover all such changes and modifictions as are encompassed by the scope of the appended claims.

What is claimed is:

1. An emergency core cooling system for spraying cooling water onto a nuclear reactor core of a nuclear reactor comprising:

at least one header disposed in the nuclear reactor and arranged at an upper and outer circumferential position with respect to the reactor core;

a plurality of spray nozzles mounted on the at least one header so as to define a circumferential row of spray nozzles about the reactor core for spraying cooling water onto the reactor core, the spray nozzles having a center axis, at least one of the plurality of spray nozzles of the row being mounted on the at least one header so that the center axis thereof extends upwardly with respect to a horizontal axis and at least one of the remaining plurality of spray nozzles of the row has the center axis thereof extending downwardly with respect to the horizontal axis; and means for conducting cooling water to the at least one header.

2. An emergency core cooling system according to claim 1, wherein a first plurality of spray nozzles have the center axes thereof extending upwardly and a second plurality of remaining spray nozzles have the center axis thereof extending downwardly.

3. An emergency core cooling system according to claim 2, wherein the at least one header is a ring header.

4. An emergency core cooling system according to claim 3, wherein the first plurality of spray nozzles having nozzle center axes extending upwardly are mounted on the at least one header at mounting angles $\theta$ which fall within a range of $+8° \leq \theta \leq +25°$ with respect to the horizontal axis where $\theta = 0°$.

5. An emergency core cooling system according to claim 4, wherein the second plurality of spray nozzles having nozzle center axes extending downwardly are mounted on the at least one header at mounting angles $\theta$ which fall within a range of $-6° \theta \leq -1°$ with respect to the horizontal axis where $\theta = 0°$.

6. An emergency core cooling system according to claim 3, wherein the second plurality of spray nozzles having nozzle center axes extending downwardly are mounted on the at least one header at mounting angles $\theta$ which fall within a range of $-6° \leq \theta \leq -1°$ with respect to the horizontal axis where $\theta = 0°$.

7. An emergency core cooling system according to claim 3, wherein the first and second plurality of spray nozzles of the row are alternately arranged about the header.

8. An emergency core cooling system according to claim 1, wherein two headers are provided, the two headers including an upper header and a lower header arranged at an upper and outer circumferential position with respect to the reactor core, a plurality of spray nozzles being mounted so as to define a circumferential row of spray nozzles about the reactor core on each of the upper and lower headers for spraying cooling water onto the reactor core, and at least one of the plurality of nozzles of the row mounted on the lower header having the center axis thereof extending upwardly with respect to the horizontal axis and at least one of the remaining plurality of nozzles of the row mounted on the lower header having the center axis thereof extending downwardly with respect to the horizontal axis.

9. An emergency core cooling system according to claim 8, wherein a first plurality of the spray nozzles mounted on the lower header have the center axes thereof extending upwardly and a second plurality of the remaining spray nozzles have the center axes thereof extending downwardly.

10. An emergency core cooling system according to claim 9, wherein the upper and lower headers are ring headers.

11. An emergency core cooling system according to claim 10, wherein the first plurality of spray nozzles having nozzle center axes extending upwardly are mounted on the lower header at mounting angles $\theta$ which fall within a range of $+8° \leq \theta \leq +25°$ with respect to the horizontal axis where $\theta = 0°$.

12. An emergency core cooling system according to claim 11, wherein the second plurality of spray nozzles mounted on the lower header and having nozzle center axes extending downwardly are mounted at mounting angles $\theta$ which fall within a range of $- \leq \theta \leq -1°$ with respect to the horizontal axis where $\theta = 0°$.

13. An emergency core cooling system according to claim 12, wherein the plurality of spray nozzles mounted on the upper header have center axes mounted at mounting angles $\theta$ which fall within a range of $-10° \theta \leq +15°$ with respect to the horizontal axis where $\theta = 0°$.

14. An emergency core cooling system according to claim 13, wherein the first and second plurality of spray nozzles mounted on the lower header are alternately arranged about the lower header, and the plurality of spray nozzles mounted on the upper header are arranged thereon so that the center axes are downwardly directed and alternate ones of the spray nozzles have the same mounting angle which is different from the mounting angle of an adjacent spray nozzle.

15. An emergency core cooling system according to claim 1, wherein the first group of spray nozzles having nozzle center axes extending upwardly are mounted at mounting angles $\theta$ which fall within a range of $+8° \leq \theta \leq +25°$ with respect to the horizontal axis where $\theta = 0°$.

16. An emergency core cooling system according to claim 15, wherein the second group of spray nozzles having nozzle center axes extending downwardly are mounted at mounting angles $\theta$ which fall within a range of $-6° \leq \theta \leq -1°$ with respect to the horizontal axis where $\theta = 0°$.

17. An emergency core cooling system according to claim 16, wherein the plurality of spray nozzles mounted on the upper header have center axes mounted at mounting angles $\theta$ which fall within a range of $-10° \leq \theta \leq +15°$ with respect to the horizontal axis where $\theta = 0°$.

18. An emergency core cooling system for spraying cooling water onto a nuclear core of a nuclear reactor comprising:
at least two headers disposed in the nuclear reactor and arranged at an upper and outer circumferential position with respect to the reactor core, the two headers including an upper header and a lower header, a plurality of spray nozzles being mounted on each of the upper and lower headers for spraying cooling water onto the reactor core, a first group of the nozzles mounted on the lower header having the center axis thereof extending upwardly with respect to the horizontal axis, a second group of nozzles mounted on the lower header having the center axis thereof extending downwardly with respect to the horizontal axis, the first group of spray nozzles and the second group of spray nozzles being arranged alternately; and
means for conducting cooling water to the two headers.

19. An emergency core cooling system according to claim 18, wherein the upper and lower headers are ring headers.

20. An emergency core cooling system according to claim 18, wherein the plurality of spray nozzles are mounted so as to define a circumferential row of the spray nozzles about the reactor core on each of the upper and lower headers, alternate ones of the spray nozzles of the row mounted on the lower header having the center axis thereof extending upwardly and downwardly.

* * * * *